H. E. GOLDBERG.
CONTROLLER.
APPLICATION FILED JAN. 10, 1911.
1,165,663.
Patented Dec. 28, 1915.
4 SHEETS—SHEET 1.
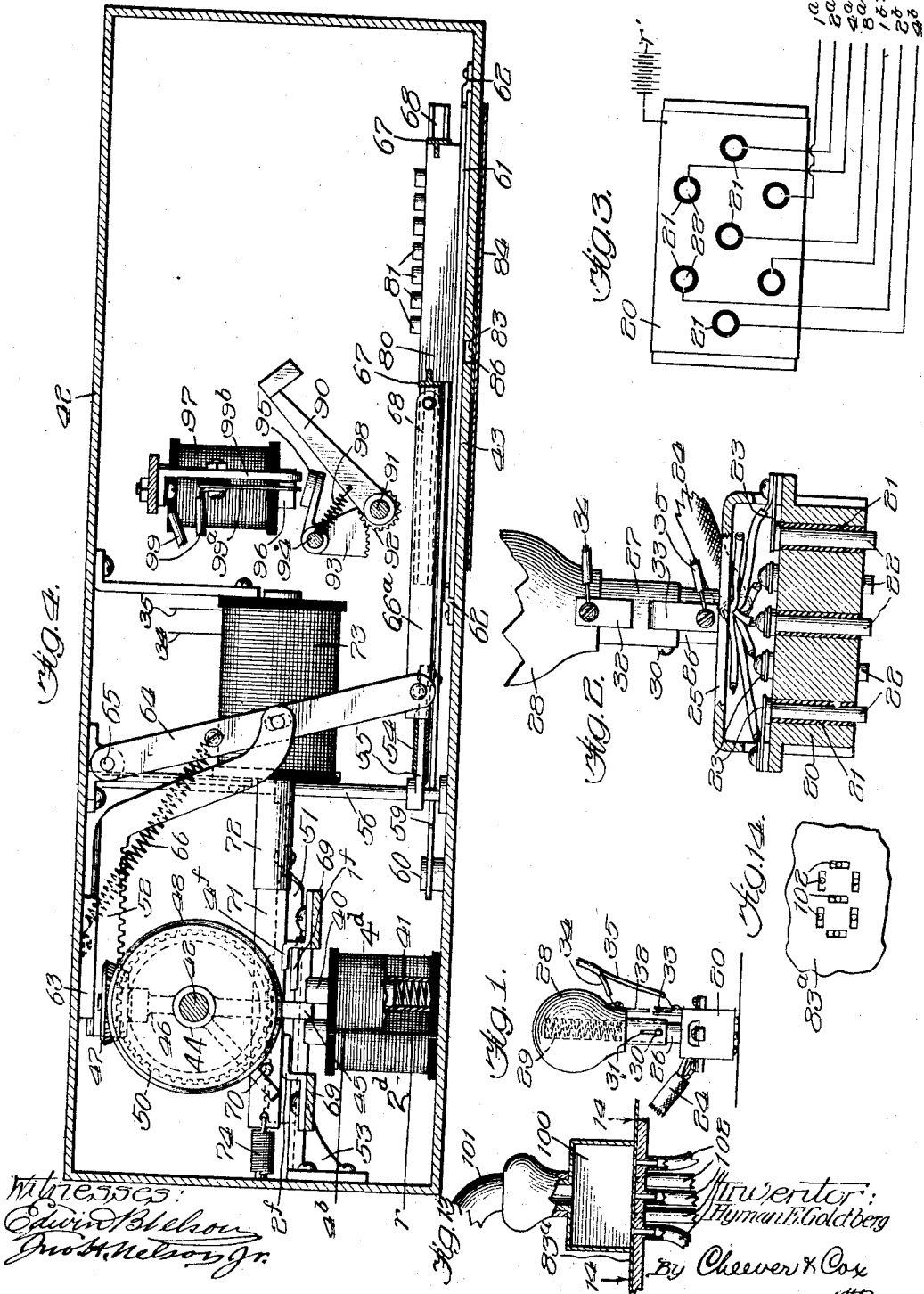

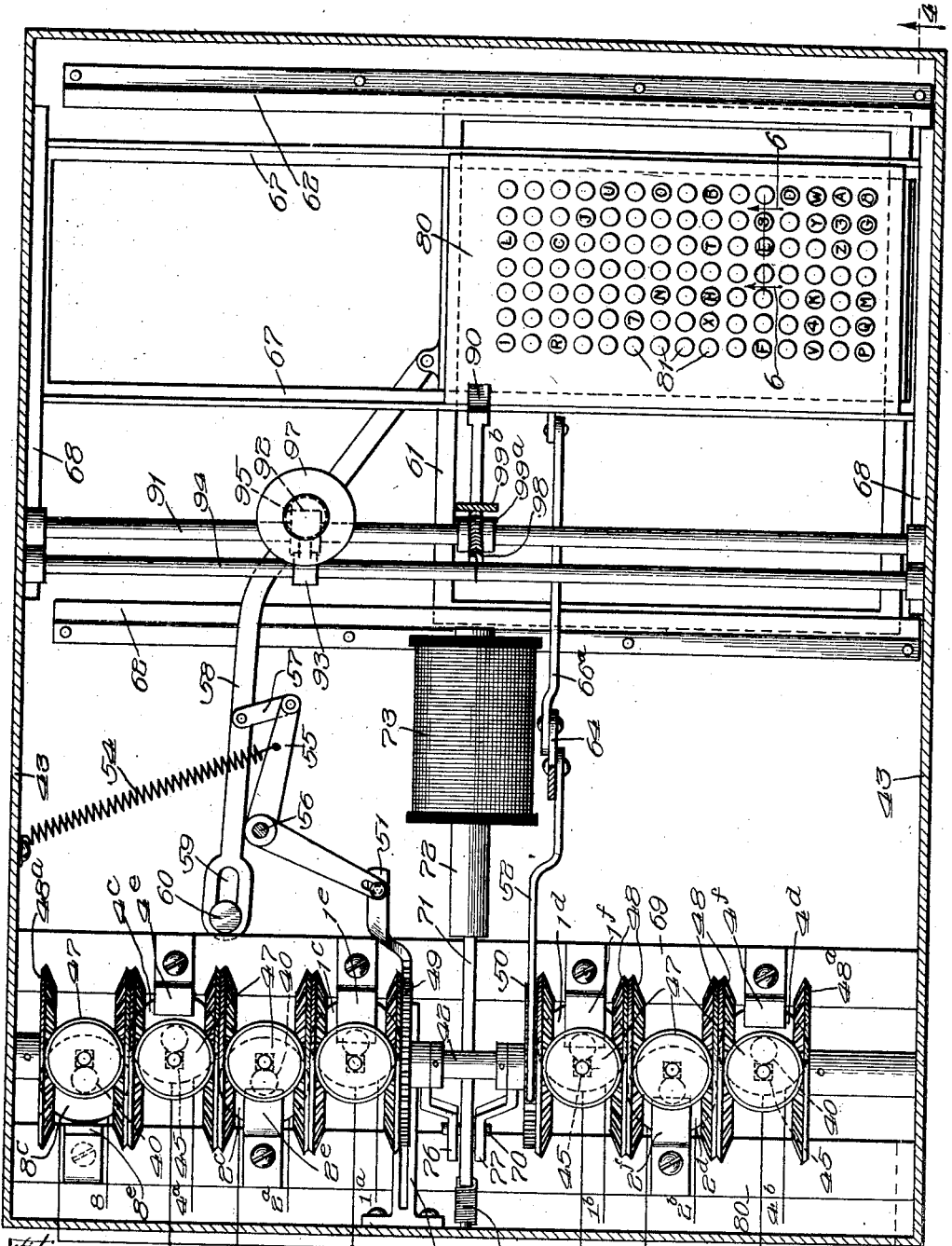

H. E. GOLDBERG.
CONTROLLER.
APPLICATION FILED JAN. 10, 1911.
1,165,663.
Patented Dec. 28, 1915.
4 SHEETS—SHEET 3.
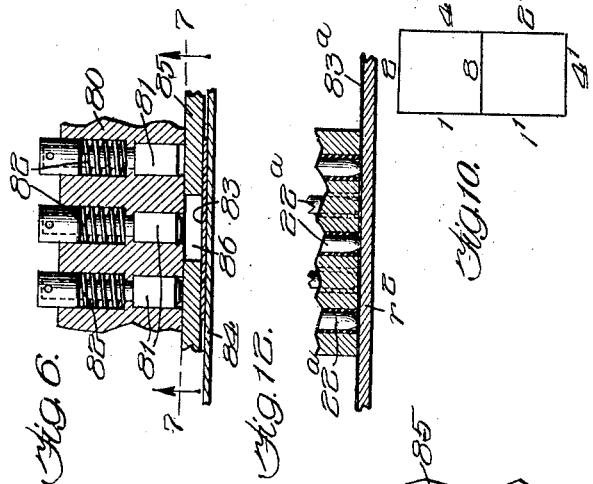
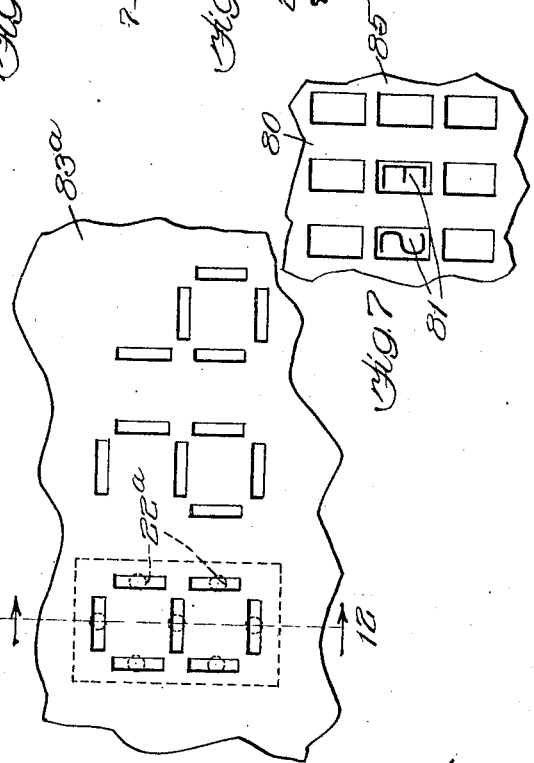
Fig. 8.
abcdefghijklmnopqrstuvwxyz 0123456789
Fig. 9.
You must acknowledge that this is readable without special training
Witnesses:
Edwin B Lelion
Jno. H. Nelson Jr.
Inventor:
Hyman E. Goldberg
By Cheever & Cox
Att'ys.

H. E. GOLDBERG.
CONTROLLER.
APPLICATION FILED JAN. 10, 1911.
1,165,663.
Patented Dec. 28, 1915.
4 SHEETS—SHEET 4.
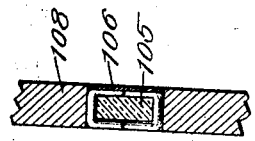
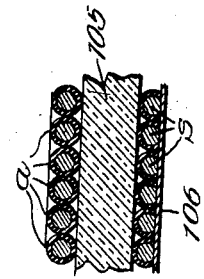
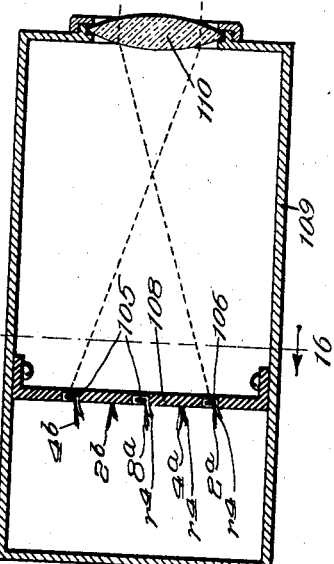
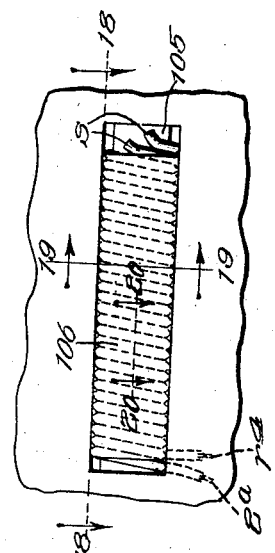
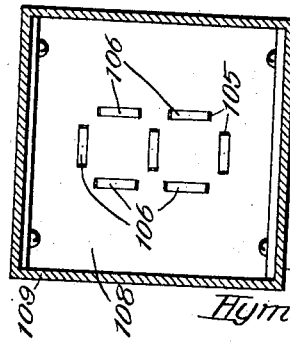

UNITED STATES PATENT OFFICE.

HYMAN ELI GOLDBERG, OF CHICAGO, ILLINOIS, ASSIGNOR OF ONE-HALF TO ROBERT P. LAMONT, OF CHICAGO, ILLINOIS.

CONTROLLER.

1,165,663.

Specification of Letters Patent. Patented Dec. 28, 1915.

Application filed January 10, 1911. Serial No. 601,837.

*To all whom it may concern:*

Be it known that I, HYMAN ELI GOLDBERG, a citizen of the United States, residing at Chicago, in the county of Cook and State of Illinois, have invented a certain new and useful Improvement in Controllers, of which the following is a specification.

My invention relates to controllers, and the object of the invention is to provide mechanism operable by a control sheet which is legible to every person having sufficient education to enable him to read. To illustrate, in the United States by my invention I produce a control sheet in which the control characters are in the form of the letters of the ordinary English alphabet and the Arabic numerals.

Another object is to provide a transmitting mechanism controlled by a control sheet having control characters composed of a number of character elements, said transmitting mechanism being adapted to be operated by all of said elements simultaneously instead of successively.

I accomplish my objects by the mechanism illustrated in the accompanying drawings, in which:

Figure 1 is a side elevation of one form of transmitting mechanism, the same being an electrical contactor. Fig. 2 is an enlarged view thereof partly in vertical section. Fig. 3 is a bottom plan view of the contactor illustrating diagrammatically the wiring thereof. Fig. 4 is a sectional elevation of the receiving mechanism which receives and records the message sent from the transmitting mechanism. Fig. 5 is a plan view of the parts shown in Fig. 4 with the top of the casing removed. Fig. 6 is an enlarged sectional view showing the construction of the type mechanism, the section being taken on the line 6—6, Fig. 5. Fig. 7 is a bottom plan view taken on the line 7—7, Fig. 6. Fig. 8 shows the alphabet and numeral digits as adopted for the transmitting mechanism. Fig. 9 is a sentence formed of the alphabet as shown in Fig. 8 and illustrating the ease with which the transmitting message may be read without special information or training. Fig. 10 is a diagram showing the key or basis upon which the letters of the alphabet and the Arabic numerals are analyzed for transmission and reproduction in accordance with my invention. Fig. 11 is a plan view of a record sheet in which the elements which form the transmitting characters consist of perforations in the control sheet. Fig. 12 is a vertical sectional view analogous to Fig. 2, but showing the type of contactor adapted to be used in connection with the perforated control sheet shown in Fig. 11. In these views 11 and 12 the operation is electric, but the contact is made through the slots in the control sheet, instead of the circuit being established through conducting ink, as in the case of the form of contactor shown in Figs. 1, 2 and 3. Fig. 13 shows a pneumatic type of transmitting mechanism, the view being partially in vertical section. Fig. 14 is a plan view taken on the line 14—14, Fig. 13. Fig. 15 is a vertical sectional view of an alternate form of transmitting apparatus, illustrating the manner in which the action of light may be utilized to transmit the message. In this form the electric conductors which control and operate the receiving mechanism are controlled by selenium cells acted upon by rays of light coming from the record or control sheet. Fig. 16 is a vertical sectional view taken on the line 16—16, Fig. 15. Fig. 17 is an enlarged face view of one of the selenium cells as viewed through the aperture in the diaphragm upon which it is mounted. Figs. 18, 19 and 20 are sectional views taken respectively on the lines 18—18, 19—19 and 20—20, Fig. 17.

Similar reference characters denote similar parts throughout the several views.

Reference will first be made to the preferred form of transmitting mechanism, which consists of the electrical contactor shown in Figs. 1, 2 and 3. The construction of this contactor is similar to that shown in my two co-pending applications, to-wit,— Serial Number 591,392, filed November 8th, 1910 and Serial Number 593,866, filed November 26th, 1910. A metallic block 20 is vertically apertured at seven different points, each aperture being lined with an insulating sleeve 21, as best shown in Figs. 2 and 3. Contacting fingers 22 are vertically slidable in said sleeves and are pressed down by leaf springs 23, these springs being secured to the block 20 but insulated therefrom. Under normal conditions, shown in Figs. 1 and 2, when the fingers are down their lower extremities project a slight distance below the block and the sleeves. A cable 24 is composed of a number of separately insulated wires, 1ª, 2ª, 4ª, 8ª, 1ᵇ, 2ᵇ, and 4ᵇ. These wires are electrically connected to the springs 23 of the different fingers, as indicated in Fig. 2, and consequently remain in electric connection with the fingers 22. The plan upon which the wires are connected to the different fingers is illustrated diagrammatically in Fig. 3. The block 20 is permanently connected to the common return conductor $r$, this return conductor being also included in the cable 24.

A bail or yoke 25 is fastened to the top of the block and has a stem 26 upon which a sleeve 27 is vertically slidable. Sleeve 27 is fastened to and forms a part of the handle 28 which is normally held in elevated position by means of a spring 29 mounted within the handle and resting upon the top of stem 26, as shown in dotted lines in Fig. 1. The upward movement of the handle under the influence of the spring is limited by a stop screw 30 screwing into stem 26 and projecting through a slot 31 formed in the side of sleeve 27. The contactor is provided with a switch consisting of the interfitting blades 32 and 33, the former being attached to the handle and the latter to the block. These blades are all insulated from the parts upon which they are supported. The blades constitute the terminals of two conductors 34 and 35, which operate motor mechanism in the transmitting mechanism hereinafter described.

In the operation of the parts above described, the fingers 22 are normally held depressed in the block and the handle 28 is elevated; the terminal blades 32 and 33 are out of contact with each other. When the contactor is brought to proper position upon the control sheet the fingers 22 will support the mechanism and hold the block 20 up out of contact with said sheet. When the handle is depressed, the first result is to bring the block 20 down into contact with the control sheet, the force of the downward pressure on the handle causing the springs 23 to yield. After the block is in contact with the sheet, the further depression of the handle will bring the terminals 32 and 33 into engagement and establish a circuit through the conductors 34 and 35. Reversely, when the handle is relieved of the pressure of the hand of the operator the first action will be to break the circuit through the conductors 34 and 35 and subsequently permit the block to rise from the surface of the control sheet.

According to my invention I resolve the letters of the English alphabet and the Arabic numerals into a number of component elements, each one of which is common to a number of said letters and numerals. In the present case the number of individual elements is seven, arranged approximately in the form of two contiguous squares, or a conventionalized figure 8, as illustrated in Fig. 10. Practically speaking, any English alphabetical letter or Arabic numeral may be formed by selecting the proper combination of these elements. In some instances, for example in the case of "M" and "W", (see Fig. 8 of the drawings) the letter has an extra portion (the horizontal lines) which is not present in the ordinary standard form of letter but which performs a necessary function in connection with my apparatus. Said extra portion, however, does not render the character any less legible. To these character elements I ascribe certain numerical values, to-wit, 1, 2, 4, 8 in the upper square and again 1, 2, 4 in the lower, as shown in Fig. 10, and then obtain two totals, one obtained by adding together the values of the character elements appearing in the upper square and the other by adding together the values of the character elements appearing in the lower square in the letter or numeral character under consideration. The middle horizontal character element is considered as belonging to the upper square and not to the lower one. I then plot the totals from the upper square as ordinates and those from the lower square as abscissæ, as the terms are employed in coördinate geometry, and I thereby obtain a number of locations amply sufficient for all the letters of the alphabet and all the numerals. To illustrate, I cause the resulting combinations in the upper square to produce vertical movements and those in the lower square to produce horizontal movements in a movable body; and the number of different positions which said body will be brought to will be one hundred and twenty eight, which is more than sufficient for the alphabetical letters and the Arabic numerals. The control sheet or record sheet or transmitting sheet, as it may be variously called, upon which the control characters in the form of English alphabetical letters or Arabic numerals appear, may assume a variety of different forms, several of which are here illustrated, and I will first describe a form well adapted for use in connection with the contactor shown in Figs. 1, 2 and 3. In this form the message to be transmitted is written or printed upon the sheet in a substance which may be termed conducting ink and which forms the subject of a co-pending application filed October 28, 1910, Serial Number 589,565.

The letter or numeral characters are formed as shown in Figs. 8 and 9 of the drawings, and for the present I will merely say that the ink-formed character elements of the different letters and numerals serve as conductors to connect different ones of the fingers 22 of the contactor with the conducting block 20, which, through the conductor $r$, forms a common return for the conductors, $1^a$, $2^a$, $4^a$, $8^a$, $1^b$, $2^b$, $4^b$. When the contactor is positioned upon the control sheet it is placed in such manner that the fingers belonging to the group of conductors $1^a$, $2^a$, $4^a$, $8^a$, will contact the upper half of the characters while the fingers belonging to the group of conductors $1^b$, $2^b$, $4^b$, will contact the lower half. Let it be assumed that the conductor $r$ is permanently in circuit with a battery $r'$ or other source of electromotive force so that the block 20 may be considered as being permanently "alive." Under these conditions when the conducting ink upon the control sheet connects any finger 22 with the said block, a circuit will be established through the corresponding one of the conductors $1^a$, $2^a$, $4^a$, $8^a$, $1^b$, $2^b$, $4^b$. For convenience the conductors last enumerated may be considered to be control conductors while the conductors 34 and 35 shown in Figs. 1 and 2 and hereinabove described may be considered to be the motor conductors through the agency whereof power is furnished for moving the parts in the receiving mechanism.

I will now describe the receiving mechanism selected to illustrate the invention, and shown in Figs. 4 and 5: Each of the control conductors, $1^a$, $2^a$, $4^a$, $8^a$, $1^b$, $2^b$, $4^b$, runs to an electromagnet, $1^c$, $2^c$, $4^c$, $8^c$, $1^d$, $2^d$, $4^d$, respectively. These are the control magnets and the conductor $r$ forms a common return for them. These magnets are provided with cores 40 supported upon springs 41 so that normally the upper ends of the cores project above the magnets, as shown in Fig. 4. A shaft 42 is non rotatively supported in the casing 43 of the receiving mechanism and lies above the row of magnets mentioned. Above each magnet a hub 44 is mounted upon shaft 42 so as to be independently rotatable but non shiftable thereon. Depending from each hub is an arm 45, which, by mechanism to be described, is spring pressed against the side of the associated core 40 when the latter is in projected position, as in Fig. 4. Extending upward from each hub 44 is an arm 46 which carries at its upper end a bevel pinion 47. Each of these pinions is freely rotatable upon its arm, and meshes at its two opposite sides with bevel gears 48 which are all freely rotatable upon shaft 42, with the exception of the gears $48^a$ which occur at the outer ends of the series and are rigidly fastened to the shaft so as to be non rotatable and non shiftable.

From the above description and an inspection of the drawings it will be seen that there are two groups of controlling magnets, one comprising four and the other three, and that there are eight bevel gears in the larger group and six in the smaller group, all of the gears of a group constituting, when taken with their intermeshed pinions, two trains of gears, all of which are rotatable about shaft 42, except the outer gears $48^a$. The bevel gears located between any two bevel pinions are rigidly secured together so as to rotate as a single piece. A spur gear 49 is rigidly fastened to the inner bevel gear of the larger group and a similar gear 50 to the inner bevel gear of the smaller group, as best shown in Fig. 5.

A rack 51 engages with the under side of gear 49 and a rack 52 engages with the upper side of gear 50. Rack 51 is guided in its longitudinal movement by a stationary bracket 53, and is constantly urged to the right (Fig. 5) by a spring 54 which is attached at one end to a bell crank 55 and at the other end to the casing 43. Said crank is pivoted upon the post 56 and is articulately connected to the inner end of rack 51. Said crank is connected by a link 57 to a lever 58 having a slot 59 at one end making sliding engagement with a stationary fulcrum pin 60. The other end of lever 58 is articulately connected to a frame 61 which is slidingly mounted in stationary guides 62. The tendency of spring 54 is, therefore, to move frame 61 toward the top of the sheet, Fig. 5 of the drawings. For convenience this will be referred to as movement in a "vertical" direction. It corresponds to the ordinates hereinabove mentioned. It will be noted that the tendency of spring 54 is not only to urge frame 61 vertically upward but to simultaneously rotate gear 49 in an anti-clockwise direction (when viewed as in Fig. 4); and it will also be noted that the amount which frame 61 is permitted to move will depend upon the amount which the gear 49 is permitted to rotate.

Rack 52 engages the upper side of gear 50 and is longitudinally movable in the guides 63 fastened to the top of the casing, as shown in Fig. 4. Said rack has a slot and pin connection with the lever 64 which is pivoted at its upper end to a stationary fulcrum 65. A spring 66 is attached at one end to said lever and at the other end to the casing in such manner as to tend to urge the lower end of said lever to the left (Figs. 4 and 5). Lever 64 is articulately connected at its lower end to a link $66^a$ which in turn is articulately connected to the frame 67. Frame 67 is supported in stationary guides 68 arranged in such manner as to permit said frame to slide in a direction transverse to the direction of movement of frame 61. For convenience, this will be referred to as the "horizontal" movement of the frame. It corresponds to the abscissæ hereinabove mentioned. Obviously, the amount which spring 66 may shift frame 67 toward the left is limited by the amount which spur gear 50 is permitted to rotate in an anticlockwise direction when viewed as in Fig. 4.

It will be seen that the amount which the spur gears 49 and 50 may rotate in an anticlockwise direction will be proportionate to the sum of the individual rotations of the arm 45 about shaft 42 as an axis. Under normal conditions these arms are locked against rotation by the magnet cores 40. When any magnet core is retracted, its arm is free to rotate under the influence of the spur gears mentioned, until its movement is limited by its respective stop (assuming that the motor mechanism or returning device hereinafter described is non acting). These stops $1^e$, $2^e$, $4^e$, $8^e$, $1^f$, $2^f$, $4^f$, are mounted upon stationary cross bars 69 and are of graded lengths, the stop $1^e$ permitting the arm nearest to gear 49 to rotate one step, stop $2^e$ permitting the next arm 45 to rotate two steps, stop $4^e$ permitting its arm to rotate four steps, and the last or outer stop $8^e$ permitting its arm to rotate eight steps. In a similar manner the stop $1^f$ nearest to the gear 50 permits its arm to rotate one step, the next stop $2^f$ permits its arm to rotate two steps, and the last or outer stop $4^f$ permits its arm to rotate four steps.

As a result of the above described construction the amount of movement of frame 61 vertically upward will be proportionate to the sums of the individual rotations of the arms associated with the gear 49, and the amount of movement of the frame 67 toward the left will be proportionate to the sums of the individual rotations of the arms associated with the gear 50. To illustrate, if the arm coöperating with stop $2^e$ is released, frame 62 will move vertically two steps. If the arms coöperating with the stops $2^e$ and $4^e$ are released, frame 61 will move six steps. If the arms coöperating with all of the stops $1^e$, $2^e$, $4^e$, $8^e$, are released the frame will move fifteen steps.

I will now describe the motor mechanism by which all of the parts are returned to initial position and the springs 54 and 66 strained to provide the power for operating the receiving mechanism at the next succeeding cycle of operation of the apparatus. Extending from the hubs of the gears 49 and 50 are two arms 76 and 77 respectively which are adapted to be engaged by the pin 70 carried by the rod 71 forming an extension of the core 72 of the motor magnet 73. A spring 74 is attached at one end to rod 71 and at the other end to the casing 43, and the strength of the spring and arrangements of the parts is such that when magnet 73 is deënergized spring 74 will overcome the forces of the springs 54 and 66 and rotate the gears 49 and 50 to initial position, to enable the magnet cores 40 to reëngage their respective arms 45.

The recording devices of the receiving mechanism may assume different forms, and in the present instance, consist of a type plate 80 which is slidingly supported in the frame 67 in such manner as to be shiftable in a direction transverse to the direction of motion of said frame in the guides 68. Plate 80 extends down to the open frame 67 where it is slidingly engaged by the frame 61. The parallel slides of said frame 61 form guides in which the plate may be shifted in frame 61 in a direction transverse to the movement of said frame in its guides 62. Said plate is provided with a set of type constituting the Arabic numerals and the letters of the English alphabet. These are arranged in eight columns and sixteen horizontal rows. This provides for 8 times 16 or 128 different locations on said plate, only a portion of which are necessary for the Arabic numerals and letters of the alphabet.

The type at the acting locations may be variously constructed, a suitable form being shown in Figs. 6 and 7. In this form the type 81 consists of plungers vertically movable in plate 80 and normally held in elevated non acting position by springs 82 let into said plate. The printing portion is formed at the lower end of the plunger and when depressed will print upon the receiving sheet 83 supported upon the platen 84. The paper 83 is normally protected from accidental impressions by the bottom 85 of the casing 43, which has an aperture 86 through which the type temporarily at the printing point may descend.

The type member temporarily at the printing point is depressed by suitable impression mechanism, illustrated for example in Fig. 4. In this form a hammer 90 is mounted on a shaft 91 rigidly secured to a pinion 92 which meshes with a circular rack 93 fulcrumed upon a shaft 94 and provided with an armature 95 adapted to be attracted to the core 96 of the printing magnet 97. Hammer 90 is normally held in raised position by a spring 98. Magnet 97 is energized through two conductors 99 and the parts are so related and constructed that when said magnet is energized the hammer will strike the top of the type member at the printing point and cause an impression to be made. The circuit through this magnet is closed by bringing the spring terminal $99^a$ into contact with the terminal $99^b$, which is accomplished by the core 72 of magnet 73 when the latter is energized.

In the operation of the parts heretofore described the message to be transmitted is written upon the control sheet in conductive ink in the alphabetical characters and numerals shown in Fig. 8. The transmitter shown in Figs. 1, 2 and 3 is then placed over the character to be transmitted in such manner that the fingers 21 will contact their proper portions or elements of the character. The handle 28 is then depressed, first bringing the conductive block 20 into contact with the control sheet, and as said block surrounds all of the fingers 22, it is sure to come into contact with some portion of whatever character elements are present in the character over which the transmitter has been placed.

As block 20 is at all times electrically connected to the common return conductor $r$ a circuit will be established through the conductive ink and the corresponding ones of the control conductors, $1^a$, $2^a$, $4^a$, $8^a$, $1^b$, $2^b$, $4^b$. The energizing of these conductors causes the retraction of the corresponding ones of the cores 40 of the control magnets 41 and releases the corresponding ones of the arms 45 to permit the springs 54 and 66 to shift the type plate 80 to bring the proper character to printing position. But such motion of the arms is as yet prevented by the pin 70, associated with the magnet 73 and spring 74. The continued depression of the transmitter handle 28 brings the terminals 32 and 33 of the motor switch into contact and thereby energizes the motor magnet 73, and withdraws pin 70 out of the way of arms 76 and 77, thus permitting them to move the type plate to printing position. Core 72 at the end of its motion brings the terminal $99^a$ into contact with terminal $99^b$ and thereby establishes a circuit through the conductors 99 of the impression magnet 97 and thereby causes the printing hammer 90 to descend and cause the type to print.

Thus far in the description I have explained a type of mechanism operable from a control sheet in which the characters were formed in conductive ink. The control sheet is not necessarily provided with ink characters, however, for the characters may be formed by slots or perforations in the paper instead of ink lines upon the paper, as illustrated in Figs. 11 and 12. In this form the record sheet $83^a$ has a number of elongated slots arranged in the same manner as the ink character elements. When using a perforated control sheet the fingers $22^a$, shown in Fig. 12, will preferably be more rounded or pointed at their lower ends to facilitate penetration through the perforations to enable them to reach the underlying conductive plates $r^2$ which will be permanently in electrical connection with the common return conductor $r$.

A perforated control sheet, however, is not limited in its function to use in connection with electrical apparatus. A perforated control sheet of exactly the same form as shown in Fig. 11 may be employed in connection with pneumatic apparatus as indicated in Figs. 13 and 14. In this form the transmitter is replaced by a hood 100 adapted to fit over the entire character, said hood being supplied with air under pressure through the pipe 101. In this case, instead of the conductors $1^a$, $2^a$, $4^a$, etc. there will be substituted air-carrying ducts 102 which may operate the parts 40 for the purpose described.

I have now described my legible control sheet in a form in which the characters consist of lines of conducting ink and also in a form in which the characters consist of slots or perforations arranged according to the same plan as the ink elements. I will now describe a form of control sheet and co-operating transmitting apparatus in which the control characters utilize the activity of light rays. This type of control sheet and transmitting apparatus is shown in Figs. 15 to 20 inclusive. It is known that selenium is practically a non conductor when in the dark but that its resistance when subjected to the light is only about one-half of one per cent. as great as it is in the dark. This peculiar property of selenium has been recognized, and selenium cells have been constructed by which two conductors could practically be short circuited by exposing the cell to the action of light, the connection between said conductors being substantially broken by shielding the cells from the light. When I wish to operate by means of light instead of by electricity or compressed air I lead the control conductors $1^a$, $2^a$, $4^a$, $8^a$, $1^b$, $2^b$, $4^b$ respectively to one terminal of a set of selenium cells and the return conductor $r$ I branch so as to connect it with the remaining terminals $r^4$ of the respective cells. This is best illustrated in Fig. 15. The conductors $s$ are wound in parallel around a core 105, the conductors being insulated from each other and open at the ends, as shown at the right end of Fig. 17. The insulation is then removed from one of the faces of the cell and a layer 106 of selenium is applied so as to contact the bare conductors. It is evident that when no light falls upon the selenium 106 the wires $s$ will be insulated, but when light does fall upon the selenium said conductors will be practically short circuited. I purposely construct these cells so that their light-susceptible faces will assume the shape of elongated rectangles. These cells are then mounted in a diaphragm 108 arranged vertically in a light-tight casing 109, best shown in Figs. 15 and 16. In this diaphragm a number of slots or perforations are formed in precisely the same manner as the slots or perforations in the perforated control sheet shown for example in Fig. 11. The cells are mounted in the slots of the diaphragm in such position that their sensitive faces will be turned toward the lens 110 mounted in the front of the casing 109, as shown in Fig. 15. For this form of apparatus the control sheet $83^b$ bears control characters which are in contrast to the main body of the sheet. In the form illustrated in Fig. 15 the characters appear in white or some other light-reflecting shade upon a dark background. It is obvious that under these conditions light will be deflected from the control sheet only at such portions where a character element appears and consequently only those cells will be acted upon which correspond to the character element actually present in the character being transmitted. Instead of the light being reflected from the white surface of the control character on the sheet 83ᵇ, shown in Fig. 15, the sheet might be perforated and the light come from behind the sheet, which would then act as a screen to cut off all light except where there is a character element to let it through. With apparatus of this kind the operation of the receiving mechanism shown in Figs. 4 and 5 would be the same as has been already described.

In describing the selenium form of apparatus I explained a form of control sheet in which the characters were white while the background was black, which required absolutely no change in the receiving mechanism above described. Should I desire to make use of a white background, as ordinary paper, and make the characters in black, as with ordinary ink, the only change required in the receiving apparatus would be a redistribution of the type to different locations upon the plate 80.

In the receiving mechanism above described printing type are placed at the various locations. However, instead of printing type, type matrices may be substituted as in the Lanston Monotype. By making such a substitution the receiving mechanism would become a type casting instead of a type printing machine. Other similar substitutions may suggest themselves to those skilled in the art.

It will be seen that in all forms of my apparatus there are a plurality of energy conveyers arranged between the control sheet and the body whose motion it is the ultimate object of the apparatus to control. Thus in the form using the electrically conductive control characters the energy conveyers are the electric conductors through which the circuit is closed by said control characters. In the pneumatic form in which the control characters are composed of perforations in the control sheet the energy conveyers are the ducts for the air or other actuating fluid entering through the apertures in the control sheet. In the form where the control characters are composed of light transmitting elements as in Fig. 15 the conveyers are the electric conductors connected to the selenium cells.

Having thus described my invention, what I claim as new and desire to secure by Letters Patent is:—

1. A control sheet having bidimensional control characters, in combination with a movable body adapted to be moved forward different amounts depending upon the form of the control character in action, and means for displacing said movable body from its normal position a distance dependent on the form of the control character in action.

2. A control sheet having control characters in the form of letters of the English alphabet, in combination with a movable body adapted to be moved forward different amounts depending upon the form of the control character in action, and means for removing said body from its normal position a distance dependent upon the form of the control character in action.

3. A control sheet having control characters composed of a set of acting elements arranged upon a plan approximating an 8, in combination with a differentionally movable body, and means controlled by said control characters adapted to move said body forward different amounts depending upon the form of the control character in action.

4. In combination, a movable body, a control sheet, an electrically conductive control character thereon whose elements are arranged bidimensionally, and electromagnetic means governed by said character for causing forward movement in said body to an amount dependent upon the particular form of said character.

5. In combination, a movable body, a control sheet having thereon electrically conductive characters in the form of letters of the English alphabet, and electromagnetic means governed by said character for causing forward movement in said body a distance dependent upon the particular form of the control character in action.

6. A control sheet having thereon electrically conductive control characters composed of a set of acting elements arranged upon a plan approximating an 8, in combination with a movable body and electromagnetic means governed by said characters for causing forward movement in said body a distance dependent upon the particular form of the character which is acting.

7. A control sheet having control characters thereon the elements whereof are arranged bidimensionally, in combination with a movable body, and motor means adapted to move said body forward different amounts depending upon the control character in action, said motor means comprising a plurality of energy conveyers arranged in parallel between said control sheet and said movable body, and means controlled by the characters upon said control sheet for simultaneously energizing a plurality of said conveyers, the conveyers energized depending upon the control character in action, and the amount of forward movement of said movable body depending upon the conveyers energized.

8. A control sheet having control characters in the form of the letters of the English alphabet, in combination with a movable body, and motor means adapted to move said body forward different amounts depending upon the control character in action, said motor means comprising a plurality of energy conveyers arranged in parallel between said control sheet and said movable body and an energy receiver operated by the energy of the energized conveyers for moving said movable body, and means controlled by the characters upon said control sheet for simultaneously energizing a plurality of said conveyers, the conveyers energized depending upon the control character in action, and the amount of forward movement of said movable body depending upon the conveyers energized.

9. A control sheet having control characters arranged upon the plan approximating an 8, in combination with a movable body, and motor means adapted to move said body forward different amounts depending upon the control character in action, said motor means comprising a plurality of energy conveyers arranged in parallel between said control sheet and said movable body and means operated by the energy in said energy conveyers, and means controlled by the characters upon said control sheet for simultaneously energizing a plurality of said conveyers, the conveyers energized depending upon the control character in action, and the amount of forward movement of said movable body depending upon the conveyers energized.

10. In a system of telegraphy, the combination of a receiver having a movable body therein, a transmitter having a set of terminals arranged bidimensionally, electrical connections between said transmitter and receiver, said electrical connections comprising a plurality of conductors connected in multiple and means operated by current in said conductors and adapted to move said body forward and arrest it, and a control sheet having electrically conductive bidimensional control characters thereon adapted to close the circuit simultaneously through various ones of said transmitter terminals to thereby simultaneously energize a plurality of said conductors for the purpose of moving the movable body in the receiver forward different amounts dependent upon the form of control character contacted by the transmitter.

11. In a system of telegraphy, the combination of a receiver having a movable body therein, a transmitter, electrical connections between said transmitter and receiver, said connections comprising a plurality of conductors connected in multiple and extending from the transmitter to the receiver and electromagnetic means operated by said conductors, and a control sheet having thereon electrically conductive characters in the form of letters of the English alphabet, said characters being adapted to simultaneously energize various combinations of said conductors for the purpose of moving the movable body in the receiver forward different amounts dependent upon the form of control character in action.

12. In a system of telegraphy, the combination of a receiver having a movable body therein, a transmitter, electrical connections between said transmitter and receiver, said connections comprising a plurality of conductors connected in multiple, and extending from the transmitter to the receiver and electromagnetic means operated by said conductors, and a control sheet having electrically conductive control characters arranged upon a plan approximating an 8, said characters being adapted to simultaneously energize various combinations of said conductors for the purpose of moving the movable body in the receiver forward different amounts dependent upon the form of control character in action.

13. A control sheet having thereon control characters composed of elements arranged bidimensionally in combination with a movable body, means for moving said body forward and means for arresting it at a predetermined position, depending upon the form of the control character.

14. A control sheet having thereon control characters in the form of letters of the English alphabet in combination with a movable body, means for moving it forward and means for arresting it at predetermined position, depending upon the form of the control character.

15. A control sheet having thereon control characters composed of a set of acting elements arranged upon a plan approximating an 8, in combination with a movable body, means for moving the body forward, and means for arresting it at a predetermined position, depending upon the form of the control characters.

16. In a system of telegraphy, the combination of a transmitter, a control sheet having electrically conductive bidimensional control characters, a receiver having a movable recording body, and electromagnetic means arranged between said transmitter and receiver and electrically connected thereto and adapted to move said recording body forward and to arrest it at a location determined by the form of the control character contacted by said transmitter.

17. In a system of telegraphy, the combination of a transmitter, a control sheet having electrically conductive control characters simulating the letters of the English alphabet, a receiver having a movable recording body, and electromagnetic means arranged between said transmitter and receiver and electrically connected thereto and adapted to move said recording body forward and to arrest it at a location determined by the form of control character contacted by said transmitter.

18. In a system of telegraphy, the combination of a transmitter, a control sheet having control characters composed of electrically conductive elements arranged upon a plan approximating an 8, a receiver having a movable recording body, and electromagnetic means arranged between said transmitter and receiver and electrically connected thereto and adapted to move said recording body forward, and to arrest it at a location determined by the form of control character contacted by said transmitter.

19. A control sheet having bidimensional control characters, a movable body, a plurality of energy conveyers arranged in parallel between said control sheet and said movable body, means controlled by said control characters for simultaneously energizing a plurality of said conveyers, the combination of conveyers energized depending upon the form of control character in action, stopping means and means whereby the energy of said conveyers renders active said stopping means in accordance with the combination of conveyers energized for arresting said movable body at different points in its forward movement, whereby the stopping point of said movable body will depend upon the form of control character in action.

20. A control sheet having control characters in the form of the letters of the English alphabet, a movable body, a plurality of energy conveyers arranged in parallel between said control sheet and said movable body, means controlled by said control characters for simultaneously energizing a plurality of said conveyers, the combination of conveyers energized depending upon the form of control character in action, stopping means and means whereby the energy of said conveyers renders active said stopping means in accordance with the combination of conveyers energized for arresting said movable body at different points in its forward movement, whereby the stopping point of said movable body will depend upon the form of control character in action.

21. A control sheet having control characters arranged upon the plan of an 8, a movable body, a plurality of energy conveyers arranged in parallel between said control sheet and said movable body, means controlled by said control characters for simultaneously energizing a plurality of said conveyers, the combination of conveyers energized depending upon the form of control character in action, and controlling means including motor mechanism operated by the energy of said conveyers in accordance with the combination of conveyers energized and stops for arresting said movable body at different points in its forward movement, whereby the stopping point of said movable body will depend upon the form of control character in action.

22. In a system of telegraphy, the combination of a transmitter having a set of terminals arranged bidimensionally, a receiver including a movable recording body, stops for arresting said body at different points, and electromagnetically operated means for causing said body to move into coöperation with selected ones of said stops, said means including electromagnets and a plurality of conductors for energizing them, said conductors being connected in multiple; and a control sheet having electrically conductive bidimensional control characters adapted to close the circuit simultaneously through various ones of said transmitter terminals to thereby simultaneously energize a plurality of said conductors for the purpose of arresting said body at a point of its movement, dependent upon the form of control character contacted by said transmitter.

23. In a system of telegraphy, the combination of a transmitter having a set of terminals arranged bidimensionally, a receiver including a movable recording body, stops for arresting said body at different points, and electromagnetically operated means for causing said body to move into coöperation with different ones of said stops, said means including electromagnets and a plurality of conductors for energizing them, said conductors being connected in multiple and arranged between said transmitter and said receiver; and a control sheet having electrically conductive bidimensional control characters in the form of letters of the English alphabet adapted to close the circuit simultaneously through various ones of said transmitter terminals to thereby simultaneously energize a plurality of said conductors for the purpose of arresting said body at a point in its forward movement, dependent upon the form of control character contacted by said transmitter.

24. In a system of telegraphy, the combination of a transmitter having a set of terminals arranged bidimensionally, a receiver having a movable recording body, stops for arresting said body at different points and electromagnetic means for causing said body to move into coöperation with selected ones of said stops, said means including a plurality of conductors arranged in parallel and extending from the transmitter to the receiver, and electromagnets operated by the energy of said conductors;

and a control sheet having control characters composed of elements arranged upon a plan approximating an 8, said character elements being electrically conductive and said characters being adapted to close the circuit simultaneously through various ones of said transmitter terminals to thereby simultaneously energize a plurality of said conductors for the purpose of arresting said body at various points in its forward movement depending upon the form of control character contacted by said transmitter.

25. A control sheet having thereon bidimensional control characters composed of elements arranged approximately horizontally and other elements arranged approximately vertically, in combination with a body adapted to move in two transverse directions, and means controlled by the control character for moving said body in its different possible directions, the amount of motion in each direction being dependent upon the elements present in the acting control character.

26. A control sheet having thereon control characters in the form of letters of the English alphabet, in combination with a movable element adapted to be moved forward differentially in two different directions, and means controlled by said control characters for moving said body forward in its different paths of travel, the amount of its forward motion in each direction depending upon the form of the control character in action.

27. A control sheet having control characters composed of acting elements arranged upon a plan approximating an 8, in combination with a body adapted to move differentially in two transverse directions and means controlled by said control characters for moving said body forward in its different paths of travel, the amount of forward motion in each direction depending upon the form of the control character in action.

28. A control sheet having thereon bidimensional control characters composed of electrically conductive elements arranged approximately horizontally and other electrically conductive elements approximately vertically, in combination with a body adapted to move in two transverse directions, and electromagnetic means controlled by the control characters for controlling the moving of said body in its different possible directions, the amount of motion in each direction being dependent upon the elements present in the acting control character.

29. A control sheet having thereon electrically conductive control characters in the form of letters of the English alphabet, in combination with a body adapted to move in two transverse directions, and electromagnetic means controlled by the control characters for controlling the moving of said body in its different possible directions, the amount of motion in each direction being dependent upon the form of the acting control character.

30. A control sheet having thereon electrically conductive control characters composed of a set of acting elements arranged upon a plan approximating an 8, in combination with a body movable in two transverse directions and electromagnetic means governed by said characters for controlling the moving of said body along its paths of travel, the amount of travel in each path depending upon the particular form of the character which is acting.

31. A control sheet having bidimensional control characters, a movable body adapted to move in directions arranged at an angle to each other, and motor means controlled by said control sheet and adapted to move the body forward along its paths of travel different amounts dependent upon the control character in action, said motor means comprising a plurality of energy conveyers arranged in parallel between the control sheet and said movable body, means controlled by said control characters for simultaneously energizing a sub plurality of said conveyers, the sub plurality energized depending upon the form of the control character in action, and power-instrumentalities controlled by the energy of said energy conveyers, said power instrumentalities forming part of said motor means.

32. A control sheet having control characters in the form of letters of the English alphabet, a movable body adapted to move in directions arranged at an angle to each other, and motor means controlled by said control sheet and adapted to move the body forward along its paths of travel different amounts dependent upon the control character in action; said motor means comprising a plurality of energy conveyers arranged in parallel between the control sheet and in parallel between the control sheet and said movable body, means controlled by said control characters for simultaneously energizing a plurality of said conveyers, the amount of movement of said body in its different paths of travel depending upon the particular conveyers simultaneously energized, the conveyers energized depending upon the form of the control character in action, and power-instrumentalities controlled by the energy of said energy conveyers, said power instrumentalities forming part of said motor means.

33. A control sheet having control characters arranged upon a plan approximating an 8, a movable body adapted to travel forward in two directions angularly inclined to each other, and motor means controlled by said control sheet and adapted to move the body forward along its paths of control different amounts dependent upon the control character in action, said motor means comprising a plurality of energy conveyers arranged in parallel between the control sheet and said movable body, means controlled by said control characters for simultaneously energizing a plurality of said conveyers, the amount of movement of said body in its different paths of travel depending upon the particular conveyers simultaneously energized, the conveyers energized depending upon the form of the control character in action, and power-instrumentalities controlled by the energy of said energy conveyers, said power instrumentalities forming part of said motor means.

34. In a system of telegraphy, the combination of a receiver having a movable recording body adapted to move in two transverse directions, a transmitter having a set of contact terminals arranged bidimensionally, a control sheet having electrically conductive bidimensional control characters thereon adapted to close the circuit through the different terminals of the transmitter, and electrically controlled devices for controllably moving said recording body, said electrically controlled devices including a plurality of electromagnets and a plurality of electric conductors arranged in multiple and connected to said magnets and to the respective terminals of the transmitter, said electromagnets being adapted to control the movement of said recording body forward in its different paths of travel in accordance with the form of the control character contacted by the transmitter.

35. In a system of telegraphy, the combination of a receiver having a movable recording body adapted to move in two transverse directions, a transmitter having a set of contact terminals arranged bidimensionally, a control sheet having electrically conductive bidimensional control characters in the form of letters of the English alphabet, said characters being adapted to close the circuit through the different terminals of the transmitter, and electrically controlled devices for controllably moving said recording body, said electrically controlled devices including a plurality of electromagnets and a plurality of electric conductors arranged in multiple and connected to said magnets and to the respective terminals of the transmitter, said electromagnets being adapted to control the movement of said recording body forward in its different paths of travel in accordance with the form of the control character contacted by the transmitter.

36. In a system of telegraphy, the combination of a receiver having a movable body adapted to move in two transverse directions, a transmitter having a set of contact terminals arranged bidimensionally, a control sheet having control characters composed of electrically conductive elements arranged approximately upon the plan of an 8, said characters being adapted to close the circuit through the different terminals of the transmitter, and electrically controlled devices for controllably moving said recording body, said electrically controlled devices including a plurality of electromagnets and a plurality of electric conductors arranged in multiple and connected to said magnets and to the respective terminals of the transmitter, said electromagnets being adapted to control the movement of said recording body forward in its different paths of travel in accordance with the form of the control character contacted by the transmitter.

37. A control sheet having thereon bidimensional control characters, in combination with a body capable of moving forward along a path formed of two components arranged at an angle to each other, means for moving said body, and means for arresting said body at predetermined points in each of said components, the stopping point depending upon the form of the control character.

38. A control sheet having thereon control characters in the form of letters of the English alphabet, in combination with a body capable of moving forward along a path formed of two components arranged at an angle to each other, means for moving said body, and means for arresting said body at predetermined points in each of said components, the stopping points depending upon the form of the control character.

39. A control sheet having control characters composed of a set of acting elements arranged upon a plan approximately an 8, in combination with a body capable of moving forward along a path formed of two components arranged at an angle to each other, means for moving said body, and means for arresting said body at predetermined points in each of said components, the stopping point depending upon the form of the control character.

40. In a system of telegraphy, the combination of a transmitter, a control sheet having electrically conductive bidimensional control characters, a receiver having a body adapted to travel along two transverse paths, means for moving said body, means for arresting said body, and electromagnetic controlling means electrically connected to said transmitter and adapted to determine the point at which said body shall be arrested.

41. In a system of telegraphy, the combination of a transmitter, a control sheet having electrically conductive control characters simulating the letters of the English alphabet, a receiver having a body adapted to travel along two transverse paths, means for moving said body, means for arresting said body, and electromagnetic controlling means electrically connected to said transmitter and adapted to determine the point at which said body shall be arrested.

42. A control sheet having thereon control characters composed of a set of electrically conductive elements arranged upon a plan approximating an 8, in combination with a movable body, means adapted for moving said body in each of two transverse directions, and electromagnetic means controlled by said characters for arresting the forward movement of said body in each direction at a predetermined point therein, the point depending upon the form of the control character which is acting.

43. A control sheet having bidimensional control characters, in combination with a movable body capable of moving forward in directions angularly inclined to each other; motor mechanism adapted to move said body forward along its paths of travel; stops to arrest said body at different locations in its line of travel, said motor mechanism including power instrumentalities and a plurality of simultaneously energizable energy conveyers whereby said power instrumentalities are controlled; and means controlled by said control characters for simultaneously energizing different sub-pluralities of said conveyers, the stops called into play depending upon the sub-plurality of the conveyers energized, and the sub-pluralities depending upon the form of the control character in action.

44. A control sheet having control characters in the form of letters of the English alphabet, in combination with a movable body adapted to move in directions angularly inclined to each other, driving mechanism adapted to move said body along its paths of travel and controlling mechanism adapted to arrest said body at different locations in its lines of travel depending upon the control character in action, said controlling mechanism including a plurality of simultaneously energizable energy conveyers and means controlled by said control character for simultaneously energizing different sub pluralities of said conveyers, the stopping points of the movable body depending upon the sub plurality of the conveyers energized and the sub pluralities depending upon the form of the control character in action.

45. A control sheet having control characters arranged upon a plan approximating an 8, in combination with a movable body adapted to move in directions angularly inclined to each other, driving mechanism adapted to move said body along its paths of travel and controlling mechanism adapted to arrest said body at different locations in its lines of travel depending upon the control character in action, said controlling mechanism including a plurality of simultaneously energizable energy conveyers and means controlled by said control character for simultaneously energizing different sub pluralities of said conveyers, the stopping points of the movable body depending upon the sub plurality of the conveyers energized and the sub pluralities depending upon the form of the control character in action.

46. In a system of telegraphy, the combination of a receiver having a recording body adapted to move in two transverse directions, a transmitter having a set of terminals arranged bidimensionally, a control sheet having electrically conductive bidimensional control characters, electric conductors arranged in multiple and connected to the respective transmitter terminals whereby pluralities of said conductors are simultaneously energized depending upon the form of control character contacted, and means for arresting said recording body at different points in its paths of travel depending upon the conductors energized, said arresting means including electromagnets operated by said conductors.

47. In a system of telegraphy the combination of a receiver having a recording body adapted to move in two transverse directions, a transmitter having a set of terminals arranged bidimensionally, a control sheet having electrically conductive control characters in the form of letters of the English alphabet, electric conductors arranged in multiple and connected to the respective transmitter terminals, whereby pluralities of conductors are simultaneously energized depending upon the form of control character contacted, and means for arresting said recording body at different points in its paths of travel depending upon the conductors energized, said arresting means including electromagnets operated by said conductors.

48. In a system of telegraphy, the combination of a receiver having a recording body adapted to move in two transverse directions, a transmitter having a set of terminals arranged bidimensionally, a control sheet having control characters composed of elements arranged upon the plan of an 8, said elements being electrically conductive whereby they may energize different ones of said terminals, electric conductors arranged in multiple and connected to the respective transmitter terminals, whereby pluralities of conductors are simultaneously energized depending upon the form of control character contacted and electromagnetically controlled instrumentalities controlled through the agency of said conductors for arresting said recording body at different points in its paths of travel depending upon the conductors energized.

49. A control sheet having thereon control characters composed of elements arranged bidimensionally, in combination with a body adapted to move differentially, and means for moving said body different amounts dependent upon the elements present in the control character which is acting.

50. A differentially movable body, a control sheet having thereon control characters composed of acting elements arranged to give the appearance of letters of the English alphabet, and Arabic numerals, and means controlled by said acting elements for moving said movable body differentially.

51. A differentially movable body, a control sheet having thereon control characters composed of acting elements arranged to give the appearance of letters of the English alphabet, and Arabic numerals, and means controlled by said acting elements for moving said movable body differentially an amount dependent upon the particular combination of acting elements.

52. A body movable differentially in two transverse directions, a control sheet having thereon control characters composed of acting elements arranged to give the appearance of letters of the English alphabet, and Arabic numerals, and means controlled by said acting elements for moving said movable body differentially in each direction an amount dependent upon the particular combination of acting elements.

53. A control sheet having control characters composed of a set of acting elements arranged upon a plan approximating an 8, in combination with a differentially movable recording body, and operating means controlled by said characters and adapted to move said body differentially, each of said acting elements causing said body to be moved an amount predetermined for that particular element, and a combination of said acting elements causing said body to be moved an amount equal to the sum of the values of all of the elements in the acting character.

54. A control sheet having control characters composed of a set of acting elements arranged upon a plan approximating an 8, in combination with a recording body differentially movable in each of two transverse directions, and operating means controlled by said characters and adapted to move said body differentially in each of said directions, certain of said acting elements controlling the moving of said body in one direction and the rest of said acting elements controlling the moving of the body in the transverse direction.

55. A control sheet having control characters composed of a set of acting elements arranged upon a plan approximating an 8, in combination with a recording body differentially movable in each of two paths arranged at an angle to each other, and operating means controlled by said characters and adapted to move said body differentially in each of its paths of movement, certain of said acting elements controlling the moving of said body along one of its paths and the rest of said acting elements controlling the moving of the body along the other of its paths, and each of said elements moving the body an amount predetermined for that particular element.

56. A control sheet having control characters composed of a set of acting elements arranged upon a plan approximating an 8, in combination with a recording body differentially movable in two directions arranged at an angle to each other, and operating means controlled by said characters and adapted to move said body differentially, certain of said acting elements tending to control the movement of the body in one direction and the rest of said elements tending to control the movement of the body in the other direction and each of said elements tending to move the body an amount predetermined for that particular element, the combination of said acting elements moving said body an amount equal to the geometric sum of the values of the elements of the character in action.

57. A control sheet having control characters composed of a set of acting elements arranged upon a plan approximating an 8, in combination with a differentially movable recording body and operating means controlled by said characters and adapted to move said body one step for one of said elements, two steps for another of said elements, four steps for another of said elements, and for a combination of said elements said operating means being adapted to move said body the sum of the amount belonging to the component elements in the acting character.

58. A control sheet having control characters composed of a set of acting elements arranged upon a plan approximating an 8, in combination with a recording body differentially movable in two transverse directions, and operating means controlled by said characters and adapted to move said body a predetermined amount for each of said acting elements, the set of acting elements being divided in two groups, the elements of one group causing the body to move in one direction and the elements of the other group causing the body to move in the transverse direction.

59. A control sheet having control characters composed of a set of acting elements approximating an 8 in combination with a recording body movable differentially in two transverse directions, and operating means controlled by said characters and adapted to move said body to an amount and in a direction depending upon the elements present in the acting control character, the set of acting elements being divided into two groups, the elements of one group causing the body to move in one direction, and the elements of the other group causing the body to move in a transverse direction, each of the elements causing the body to be moved an amount predetermined for that particular element.

60. A control sheet having thereon control characters composed of a set of acting elements arranged upon a plan approximating an 8, in combination with a recording body movable differentially in two transverse directions, and operating means controlled by said character and adapted to move said body to an amount and in a direction determined by the elements present in the acting control character, the set of acting elements of the control characters being divided into two groups, the elements of one group causing the body to be moved in one direction, and the elements of the other group causing the body to be moved in a transverse direction, one of the elements of a group causing the body to be moved one step, another two steps, another four steps and silimarly for the elements of the second group.

61. A control sheet having control characters composed of substantially rectilinear elements arranged upon a plan approximating an 8, these being employed to represent the letters of the English alphabet including the ordinals, in combination with a movable recording body and operating means controlled by said rectilinear elements for moving said body.

62. Apparatus of the class described comprising a receiver having a body movable in two transverse directions, a transmitter having a set of terminals, a plurality of electric circuits connected to said terminals, said circuits including electromagnets, and means controlled by said electromagnets whereby the movable body is moved certain amounts in one direction when some of the circuits are energized and certain amounts in the transverse direction when other of said circuits are energized.

63. In apparatus of the class described, the combination of a control sheet having control characters composed of elements arranged bidimensionally, a receiver having a movable body therein, a transmitter having a set of terminals arranged bidimensionally to coöperate with the control characters, and connections between said transmitter and receiver whereby the movable body is moved different amounts dependent upon the form of the control character, said connections including electric conductors electrically connected to said transmitter and electromagnetically controlled devices controlled through the medium of said conductors.

In witness whereof, I have hereunto subscribed my name in the presence of two witnesses.

HYMAN ELI GOLDBERG.

Witnesses:
  HOWARD M. COX,
  MARGARET D. ROBB.